United States Patent

Suzuki et al.

[11] Patent Number: 5,874,508
[45] Date of Patent: Feb. 23, 1999

[54] PROCESS FOR PRODUCING POLYALCOHOLS

[75] Inventors: Shigeaki Suzuki; Kazuyuki Yada, both of Okayama-ken, Japan

[73] Assignee: Kuraray Co., Ltd., Japan

[21] Appl. No.: 802,871

[22] Filed: Feb. 19, 1997

[30] Foreign Application Priority Data

Feb. 20, 1996 [JP] Japan .................................... 8-031669

[51] Int. Cl.$^6$ .................................................. C08G 67/02
[52] U.S. Cl. .......................... 525/471; 528/483; 528/490; 528/491
[58] Field of Search ..................... 525/471, 56; 528/483, 528/490, 491

[56] References Cited

FOREIGN PATENT DOCUMENTS

| | | |
|---|---|---|
| 0334454 | 8/1989 | European Pat. Off. . |
| 01149828 | 6/1989 | Japan . |
| 1149828 | 6/1989 | Japan . |
| 02232228 | 9/1990 | Japan . |
| 2232228 | 9/1990 | Japan . |
| 05339367 | 6/1992 | Japan . |
| 5338367 | 2/1993 | Japan . |

*Primary Examiner*—Jeffrey C. Mullis
*Attorney, Agent, or Firm*—Morrison Law Firm

[57] ABSTRACT

Polyalcohols are produced by a process comprising hydrogenating polyketones, which are copolymers of carbon monoxide and at least one olefin, in the presence of a catalyst and a solvent. The catalyst is prepared from a ruthenium-containing compound and a trialkylphosphine. The trialkylphosphine is represented by the general formula (I):

$$R^1R^2R^3P \quad (I)$$

wherein $R^1$, $R^2$, and $R^3$ each represent an alkyl group having 1 to 12 carbon groups. The carbon groups may be substituted. The process requires minimal amounts of the catalyst, and the polyalcohols produced by this method have a high hydroxyl group content.

14 Claims, No Drawings

PROCESS FOR PRODUCING POLYALCOHOLS

BACKGROUND OF THE INVENTION

The present invention relates to a process for producing polyalcohols. More particularly, the present invention relates to a process for producing polyalcohols by hydrogenating polyketones, which are copolymers of carbon monoxide and at least one olefin. The polyalcohols produced by the present invention may be used as, for example, gas-barrier materials, such as packaging materials.

It is known in the art to produce polyalcohols by hydrogenating copolymers of carbon monoxide and olefins in the presence of heterogeneous or homogeneous catalysts. Among processes employing heterogeneous catalysts, Japanese Laid-open Patent Publication Nos. 149828/1989 and 232228/1990 disclose nickel catalysts, such as Raney nickel or metallic nickel, either as is or carried on diatomaceous earth, silica, alumina or the like; Adkins catalysts, such as $CuO/Cr_2O_3$ and $CuO/Cr_2O_3/BaO$; cobalt catalysts, such as Raney cobalt and $CuO/SiO_2$; ruthenium catalysts, such as Ru/carbon, $Ru/Al_2O_3$ and $Ru/SiO_2$; palladium catalysts, such as Pd/carbon and $Pd/SiO_2$; and similar catalysts. Japanese Laid-open Patent Publication No. 339367/1993 discloses catalysts comprising a metal such as nickel, ruthenium or platinum, ruthenium oxide, Raney nickel, Adkins catalysts and the like, and preferably ruthenium carried on a-alumina or ruthenium oxide. Japanese Patent Publication No. 49203/1994 discloses a ruthenium catalyst carried on alumina having an average micropore radius of at least 100 angstroms. Japanese Laid-open Patent Publication No. 204929/1989 discloses a reduced nickel catalyst produced by reacting a metal hydride with a nickel compound.

Among processes employing homogeneous catalysts, Japanese Laid-open Patent Publication Nos. 149828/1989 and 23222811990 disclose catalysts comprising ruthenium complexes, such as dichlorotris(triphenylphosphine) ruthenium and dihydridotetrakis(triphenylphosphine) ruthenium; rhodium complexes, such as chlorotris(triphenylphosphine) rhodium; and the like. Japanese Laid-open Patent Publication No. 339367/1993 discloses catalysts comprising chlorotris(triphenylphosphine) rhodium, dichlorotris (triphenylphosphine) ruthenium, ruthenium dodecacarbonyl and the like.

To obtain polyalcohols having good gas barrier properties, it is necessary to maximize the content of hydroxyl groups in the obtained polyalcohols. It is also desirable to minimize the amount of catalyst required for commercial application of the process, due to catalyst cost.

The above prior art processes for producing polyalcohols have two principal disadvantages. First, these processes require large amounts of catalyst. For example, Japanese Laid-open Patent Publication No. 149828/1989 uses a heterogeneous catalyst comprising a nickel-rhenium catalyst in an amount of 2 g per 5 g of a polyketone copolymerized from ethylene and carbon monoxide. Japanese Laid-open Patent Publication No. 232228/1990 uses a heterogeneous catalyst comprising a copper/chromium/manganese/barium catalyst for a polyketone copolymer of ethylene, propylene and carbon monoxide, in an amount of the same weight as that of the polyketone. Japanese Laid-open Patent Publication Nos. 339367/1993 and 49203/1994 disclose a ruthenium/α-alumina catalyst in an amount of 8 g per 5 g of a polyketone copolymerized from ethylene and carbon monoxide. It is clear that such large amounts of catalysts, relative to the amounts of the reactants, are economically undesirable.

Second, these processes may result in poor selectivity of hydrogenation, that is, these processes are incapable of maximizing the content of hydroxyl groups in the products. Poor selectivity is caused by the formation of tetrahydrofuran rings in the product of the reaction. The tetrahydrofuran rings are formed from hemiacetals, which are formed by partial reduction of the carbonyl groups in the polyketones to form hydroxyl groups. The hydroxyl groups then react with the carbonyl groups, thereby decreasing the hydroxyl group content. Japanese Laid-open Patent Publication No. 204929/1989 discloses a process in which a reduced nickel catalyst is used to hydrogenate a copolymer of ethylene, propylene and carbon monoxide. In this process, about 0.9 g of the nickel compound is required per 10 g of the copolymer polyketone. Although this amount of catalyst is relatively small, compared to other conventional methods, the polyalcohol produced by this process contained 13% residual carbonyl groups and 17% tetrahydrofuran rings. It is thus virtually impossible to produce a polyalcohol having a high hydroxyl group content, and therefore good gas barrier properties, using this process.

Japanese Laid-open Patent Publication No. 304122/1989 describes a process which comprises hydrogenating a polyketone copolymerized from ethylene and carbon monoxide using a catalyst comprising a ruthenium-carbonyl complex and an iodide. The product of this reaction is a polymer comprising ethylene units and tetrahydrofuran ring units. The use of this ruthenium catalyst therefore leads principally to formation of tetrahydrofuran rings, and no polyalcohol at all.

The use of homogeneous catalysts, such as dichlorotris (triphenylphosphine) ruthenium, is described in Japanese Laid-open Patent Publication Nos. 149828/1989, 232228/1990 and 339367/1993. None of these applications, however, report any experiments using these catalysts to produce polyalcohols. The present inventors therefore attempted to conduct hydrogenation using dichlorotris (triphenylphosphine) ruthenium, as described in the above applications. However, as shown in Comparative Example 1, these processes could not produce a polyalcohol with high yield and selectivity.

OBJECTS AND SUMMARY OF THE INVENTION

Accordingly, it is an object of the present invention to overcome the limitations of the prior art.

It is another object of the present invention to provide a process for producing polyalcohols by hydrogenating polyketones, which are copolymers of carbon monoxide and olefins, in the presence of a catalyst.

It is a further object of the present invention to provide a process for producing polyalcohols which employs a minimal amount of catalyst.

Briefly stated, polyalcohols are produced by hydrogenating polyketones, which are copolymers of carbon monoxide and at least one olefin, in the presence of a catalyst and a solvent. The catalyst is prepared from a ruthenium-containing compound and a trialkylphosphine. The trialkylphosphine is represented by the general formula (I):

$$R^1R^2R^3P \qquad (I)$$

wherein $R^1$, $R^2$, and $R^3$ each represent an alkyl group having 1 to 12 carbon groups. The carbon groups may be substituted. The process requires minimal amounts of the catalyst, and the polyalcohols produced by this method have a high hydroxyl group content.

According to an embodiment of the present invention, there is provided a process for producing polyalcohols, comprising the step of hydrogenating a polyketone in the presence of a catalyst and a solvent, wherein the catalyst is prepared from a mixture of a ruthenium-containing compound and a trialkylphosphine represented by the general formula (I):

$$R^1R^2R^3P \qquad (I)$$

and wherein $R^1$, $R^2$, and $R^3$ each represents an alkyl group having 1 to 12 carbon atoms.

According to another embodiment of the present invention, there is provided a catalyst for use in producing polyalcohols from polyketones, the polyketones being copolymers of carbon monoxide and at least one olefin, wherein the catalyst comprises a mixture of a ruthenium-containing compound and a trialkylphosphine, the trialkylphosphine being represented by a general formula (I):

$$R^1R^2R^3P \qquad (I)$$

wherein $R^1$, $R^2$, and $R^3$ each represents an alkyl group having 1 to 12 carbon atoms.

The above, and other objects, features and advantages of the present invention will become apparent from the following description.

DETAILED DESCRIPTION OF THE PREFERRED EMBODIMENT

The process for producing polyalcohols comprises hydrogenating a polyketone, which is a copolymer of carbon monoxide and an olefin, in the presence of a catalyst and a solvent. The catalyst is prepared from a ruthenium compound and a trialkylphosphine, represented by the general formula (I):

$$R^1R^2R^3P \qquad (I)$$

wherein $R^1$, $R^2$ and $R^3$ each represents an alkyl group having 1 to 12 carbon atoms. In each case, the alkyl groups may be substituted. Examples of groups which may be substituted in the alkyl groups include hydroxyl, alkoxyl, alkoxyalkyl, and cyano groups.

Polyketones, which are copolymers of carbon monoxide and an olefin, are used in the present invention as the starting material. Any olefin copolymerizable with carbon monoxide can be used for this purpose with no specific limitation, either singly or in combinations of two or more. Examples of usable polyketones include polyketones obtained by radical copolymerization of carbon monoxide and an olefin (U.S.P. No. 2,495,286 and Japanese Laid-open Patent Publication Nos. 128690/1978 and 128691/1978, the entireties of which are hereby incorporated by reference); polyketones obtained by γ-irradiation copolymerization (European Polymer Journal, Vol. 9, 669 (1973), the entirety of which is hereby incorporated by reference); and polyketones obtained by alternating copolymerization of carbon monoxide and an olefin, using a catalyst comprising a transition metal compound (Japanese Patent Publication Laid-open Nos. 197427/1984, 91226/1986, 232434/1987, 53332/1987, 3025/1988, 105031/1988, 132937/1988, 149829/1989 and 67319/1990, the entireties of which are hereby incorporated by reference). Examples of preferred olefins, which should be copolymerizable in the above processes, are ethylene, propylene, 1-butene, 1-octene, isobutene, butadiene, 1,7-octadiene, vinyl acetate, styrene, methyl acrylate, methyl methacrylate and N-vinylpyrrolidone. While the present invention is not limited with respect to the process for producing the starting material polyketone and its carbonyl group content, it is nonetheless desirable, in order to obtain polyalcohols having good gas barrier properties, to use copolymers of ethylene and carbon monoxide having 40 to 50 equivalent % of carbonyl group content.

The present invention employs a catalyst prepared from a ruthenium compound and a trialkylphosphine. The trialkylphosphine may be represented by the general formula (I):

$$R^1R^2R^3P \qquad (I)$$

wherein $R^1$, $R^2$ and $R^3$ each represents an alkyl group having 1 to 12 carbon atoms, and wherein each alkyl group may be substituted, as explained below.

Any ruthenium compound can be used with no specific limitation. Usable ruthenium compounds therefore include oxides, hydroxides, salts of inorganic acids, salts of organic acids, halides and other complexes of ruthenium. More particularly, usable ruthenium compounds include ruthenium dioxide, ruthenium dihydroxide, ruthenium acetate, ruthenium chloride, dichlorobis(cyclooctadiene) ruthenium, ruthenium acetylacetonate, pentacarbonyl ruthenium, dodecacarbonyl triruthenium and tetrahydridododecacarbonyl ruthenium. These ruthenium compounds are preferably used in an amount of 0.1 to 100 mg-atom ruthenium per mole of carbonyl groups present in the starting material polyketone, more preferably 0.5 to 10 mg-atom on the same basis. A mg-atom for metal is equivalent to a mmol for a chemical compound. Therefore, the range of Ru used is preferably 0.1 to 100 mg-atom per 1000 mmol of carbonyl group, and more preferably 0.5 to 10 mg-atom per 1000 mmol of carbonyl group. Too small an amount of the ruthenium component used decreases the rate of reaction, while too large an amount is economically disadvantageous due to catalyst cost.

Examples of the phosphines which may be employed in the catalyst of the present invention include trimethylphosphine, triethylphosphine, tri-n-butylphosphine, tri-n-octylphosphine, tri-n-dodecylphosphine, dimethyl(n-butyl) phosphine, tri-isopropylphosphine and tricyclohexylphosphine. Among these, those phosphines which include an n-alkyl group having 2 to 8 carbon atoms, e.g. triethylphosphine, tri-n-butylphosphine and tri-n-octylphosphine, are preferred. The alkyl groups of these phosphines may be substituted with, for example, hydroxyl, alkoxyl, alkoxyalkyl, and cyano groups. The amount of these phosphines used will vary, depending on the type of the phosphine used, but is preferably generally 1 to 10 mmoles per 1 mg-atom of ruthenium, and more preferably 3 to 6 mmoles per 1 mg-atom of ruthenium. Too small an amount of the phosphine results in low selectivity, while too large an amount decreases the catalyst activity. The trialkylphosphines may be used individually, or alternatively in combinations of two or more.

The catalyst can be prepared in the presence of an acid or salts thereof. Inorganic and organic acids, and salts thereof can be used for this purpose. Examples of usable acids include hydrochloric acid, hydrobromic acid, sulfuric acid, nitric acid, hydroborofluoric acid, fluorosulfonic acid, phosphoric acid, trifluoroacetic acid, methanesulfonic acid, phenylphosphonic acid, p-toluenesulfonic acid, acetic acid, propionic acid and benzoic acid. Examples of usable acid salts are metal salts, e.g. sodium borofluoride, sodium phosphate, lithium trifluoroacetate, magnesium chloride and aluminum chloride; and ammonium salts, e.g. ammonium hexafluorophosphate, tetramethylammonium p-toluenesulfonate and pyridinium phenylphosphonate. These salts may be either directly added to the reaction upon preparation of the catalyst, or formed in the reaction by at first adding an acid or base to the reaction and then adding the counterpart.

The activity of the catalyst will vary, depending on the acid strength of the acid or its salt used. Use of those acids or salts thereof having a pKa of not more than 5 is particularly preferred. Here, the term "pKa" is defined as the logarithmic value of the acid dissociation constant determined in an aqueous solution at 25° C. Examples of the pKa value of representative compounds are shown, for example, in "Handbook of Chemistry and Physics", 68th Ed., pages D161–D163 (published by CRC Press).

The amount used of these acids or salts thereof employed varies according to the type of the acid or salts thereof and the trialkylphosphine used. However, generally 0.1 to 20 mmoles per 1 mg-atom of ruthenium are used, and more preferably 0.5 to 10 mmoles per 1 mg-atom of ruthenium. Too low an amount of the acids or salts thereof leads to insufficient development of a reaction-promoting effect, while too large an amount leads to increased amounts of tetrahydrofuran formed, and hence to disadvantageously low selectivity.

As for the solvent used in the invention, any solvent that can dissolve the catalyst that forms in the reaction mixture and is inactive to hydrogenation reaction may be used. Examples of usable solvents are alcohols, e.g. methyl alcohol, ethyl alcohol, n-propyl alcohol, isopropyl alcohol, n-butyl alcohol, n-octyl alcohol, cyclohexanol, ethylene glycol, diethylene glycol, ethylene glycol monomethyl ether and diethylene glycol monomethyl ether; ethers, e.g. tetrahydrofuran, dioxane, dibutyl ether, ethylene glycol dimethyl ether and diethylene glycol dimethyl ether; and sulfur-containing compounds, e.g. dimethyl sulfoxide and sulfolane.

These solvents may be used singly or in combinations of two or more. Particularly preferred solvents are sulfolane and mixed solvents containing sulfolane. Examples of components that may be mixed with sulfolane include water; alcohols, e.g. methyl alcohol, ethyl alcohol, n-propyl alcohol, isopropyl alcohol, n-butyl alcohol, n-octyl alcohol, cyclohexanol, ethylene glycol, diethylene glycol, ethylene glycol monomethyl ether and diethylene glycol monomethyl ether; and ethers, e.g. tetrahydrofuran, dioxane, dibutyl ether, ethylene glycol dimethyl ether and diethylene glycol dimethyl ether. Among these, water is most preferable for use as a component to be mixed with sulfolane.

Any mixing ratio of sulfolane to water may be employed, but the ratio of sulfolane to water is preferably from 9:1 to 1:9, more preferably from 7:3 to 3:7. Similarly, any one or more of the above other solvents may also be mixed with sulfolane. The concentration of the starting material polyketone in the solvent is generally from 0.1 to 80% by weight, more preferably 1 to 50% by weight and most preferably 5 to 20% by weight. Too high a polyketone concentration increases the solution viscosity, thereby rendering it difficult to conduct sufficient stirring; while too low a polyketone concentration is economically disadvantageous in view of reaction efficiency and solvent recovery.

The reaction is conducted generally at a temperature between 30° C. and 300° C., preferably between 100° C. and 250° C., more preferably between 150° C. and 180° C. Too low a reaction temperature results in an unsatisfactory reaction rate, while too high a reaction temperature results in an unsatisfactory selectivity.

The reaction is performed under an atmosphere of hydrogen or a combination of hydrogen and an inert gas, such as nitrogen or argon. The reaction pressure ranges from 1 to 500 atm, preferably from 20 to 300 atm and particularly from 50 to 200 atm. Too low a reaction pressure results in an unsatisfactory reaction rate, while too high a reaction pressure creates excessive and unnecessary equipment and running costs. Hydrogen may be added to make up its consumption during the reaction. Hydrogen can also be added continuously to maintain the concentration at a desired level. The reaction may be performed in a batchwise, semi-continuous or continuous manner.

The polyalcohol thus obtained can be separated from the reaction mixture by any conventional separation process. The catalyst used is, as necessary, removed from the reaction mixture by any appropriate method, such as adsorption or extraction, and then the polyalcohol is subjected to any appropriate method to remove the solvent, such as, for example, precipitation, extraction, or distillation. The polyalcohol may be further purified by conventional processes as necessary, such as, for example, reprecipitation or extraction-washing.

Example 1

A 300-ml autoclave equipped with a stirrer was charged with 16.5 g of an alternating copolymer of ethylene and carbon monoxide, 0.266 g of ruthenium acetylacetonate, 0.676 g of tri-n-butylphosphine, 0.106 g of phenylphosphonic acid and 150 ml of a mixture of sulfolane and water (ratio by volume: 60/40), and the reactor was sealed. After the atmosphere inside the reactor had been replaced by hydrogen at room temperature, hydrogen was further introduced until the inside pressure reached 100 atm. The autoclave was heated with stirring to an inside temperature of 160° C. and, after further addition of hydrogen to a total pressure of 150 atm, the reaction was continued with heating and stirring for 10 hours. After completion of the reaction, the contents were withdrawn from the reactor into acetone. The resulting polymer was precipitated, separated by filtration, washed with acetone three times and dried under reduced pressure to yield a white solid. The yield was 92%, based on the starting material polyketone. Structural analysis of the product by NMR spectroscopy revealed that the conversion of carbonyl groups was 100%, and that the selectivity was 96/4. Herein "selectivity" is defined as the molar ratio of CH(OH) structure to tetrahydrofuran ring structure, wherein if, for example, the selectivity is given as 96/4, it means 24 CH(OH) structures per one tetrahydrofuran ring structure.

Examples 2 through 6

The method of Example 1 was performed, except that the acids indicated in Table 1 were used in place of phenylphosphonic acid. The results are shown in Table 1. In the tables that follow, the yield of the obtained solid, conversion of carbonyl groups and the ratio between the CH(OH) structure and tetrahydrofuran ring structure obtained in the same manner are shown as "yield", "conversion" and "selectivity", respectively. The conversion and selectivity were calculated from the results of NMR spectroscopic analysis of the product.

TABLE 1

| Example | Acid | Acid Amount | Time (hr) | Yield (%) | Percent Conversion | Selectivity |
|---|---|---|---|---|---|---|
| 2 | Phosphoric acid | 0.066 gm | 10 | 90 | 100 | 95/5 |
| 3 | Hydrochloric acid (1N) | 0.67 ml | 10 | 88 | 100 | 96/4 |
| 4 | Acetic acid | 0.200 gm | 10 | 91 | 100 | 95/5 |
| 5 | Sodium phenyl-phosphonate | 0.120 gm | 20 | 90 | 100 | 92/8 |
| 6 | Pyridinium phenyl-phosphonate | 0.159 gm | 20 | 88 | 100 | 95/5 |

Example 7

The method of Example 1 was performed, except that no acid was used and the reaction temperature was changed to 180° C. The yield of the white solid product was 88%, based on the starting material polyketone. NMR spectroscopy revealed that the conversion of carbonyl groups and the ratio between CH(OH) structure and tetrahydrofuran structure were 100% and 92/8, respectively.

Examples 8 through 12

The method of Example I was employed, except that phosphines shown in Table 2 were used, and the reaction time was set as shown. The results are shown in Table 2.

TABLE 2

| Example | Phosphine | Amount used (gm) | Time (hr) | Yield (%) | Percent Conversion | Selectivity |
|---|---|---|---|---|---|---|
| 8 | Tri-n-octyl-phosphine | 1.24 | 20 | 92 | 100 | 95/5 |
| 9 | Tri-n-propyl-phosphine | 0.535 | 20 | 83 | 100 | 85/15 |
| 10 | n-octyl-di-n-butylphosphine | 0.865 | 10 | 90 | 100 | 95/5 |
| 11 | Triethylphosphine | 0.201 | 10 | 85 | 100 | 91/9 |
| 12 | Trimethyl-phosphine | 0.154 | 10 | 83 | 100 | 89/11 |

Example 13

The method of Example 1 was performed, except that 16.5 g of a copolymer, prepared by radical copolymerization of ethylene and carbon monoxide (copolymerization ratio of carbon monoxide: 48 equivalent %), was used in place of the alternating copolymer of ethylene and carbon monoxide. The yield of the white solid product was 85%, based on the starting material polyketone. NMR spectroscopy revealed that the conversion of carbonyl groups and the ratio between CH(OH) structure and tetrahydrofuran structure were 100% and 96/4, respectively.

Example 14

The method of Example 1 was performed, except that 16.5 g of an alternating copolymer of ethylene, propylene and carbon monoxide (composition ratio: 47/3/50) was used in place of the alternating copolymer of ethylene and carbon monoxide. The yield of the white solid product was 88%, based on the starting material polyketone. NMR spectroscopy revealed that the conversion of carbonyl groups and the ratio between CH(OH) structure and tetrahydrofuran structure were 100% and 95/5, respectively.

Example 15

The method of Example 1 was performed, except that 16.5 g of an alternating copolymer of ethylene, propylene and carbon monoxide (composition ratio: 45/5/50) was used place of the alternating copolymer of ethylene and carbon monoxide, 0.11 g of benzenesulfonic acid was used in place of phenylphosphonic acid, and the reaction time was prolonged to 20 hours. The yield of the white solid product was 87%, based on the starting material polyketone. NMR spectroscopy revealed that the conversion of carbonyl groups and the ratio between CH(OH) structure and tetrahydrofuran structure were 100% and 94/6, respectively.

Example 16

The method of Example 1 was performed, except that dichlorobis(cyclooctadiene) ruthenium was used in place of ruthenium acetylacetonate. The yield of the white solid product was 93%, based on the starting material polyketone. NMR spectroscopy revealed that the conversion of carbonyl groups and the ratio between CH(OH) structure and tetrahydrofuran structure were 100% and 93/7, respectively.

Comparative Example 1

The method of Example 1 was performed, except that the catalyst was 0.64 g of ruthenium dichlorotris (triphenylphosphine) in place of the mixture of ruthenium acetylacetonate, tri-n-butylphosphine and phenylphosphonic acid of Example 1. The yield of the white solid product was 18%, based on the starting material polyketone. NMR spectroscopy revealed that the conversion of carbonyl groups and the ratio between CH(OH) structure and tetrahydrofuran structure were 92% and 18/82, respectively.

Comparative Example 2

The method of Example 1 was performed, except that 0.876 g of triphenylphosphine was used in place of tri-n-butylphosphine, and the reaction time was set at 6 hours. The yield of the white solid product was 52%, based on the starting material polyketone. NMR spectroscopy revealed that the conversion of carbonyl groups and the ratio between CH(OH) structure and tetrahydrofuran structure were 92% and 22/78, respectively.

Having described preferred embodiments of the invention, it is to be understood that the invention is not limited to those precise embodiments, and that various changes and modifications may be effected therein by one skilled in the art without departing from the scope or spirit of the invention as defined in the appended claims.

What is claimed is:

1. A process for producing polyalcohols, comprising the step of hydrogenating a polyketone in the presence of a catalyst and a solvent, said polyketone being a copolymer of carbon monoxide and an olefin, wherein said catalyst is prepared from a mixture of a ruthenium-containing compound and a trisubstituted phosphine represented by a general formula (I):

$$R^1R^2R^3P \qquad (I)$$

wherein $R^1$, $R^2$, and $R^3$ each represents one of a substituted and an unsubstituted alkyl group having 1 to 12 carbon atoms.

2. The process according to claim 1, wherein at least one of said $R^1$, $R^2$, and $R^3$ are substituted with at least one member of the group consisting of hydroxyl, alkoxyl, alkoxyalkyl, and cyano groups.

3. The process according to claim 1, wherein said $R^1$, $R^2$, and $R^3$ are each an n-alkyl group having 2 to 8 carbon atoms.

4. The process according to claim 1, wherein said catalyst is prepared in an solution containing one of an acid and an acid salt.

5. The process according to claim 4, wherein said one of an acid and an acid salt has a pKa of not more than 5.

6. The process according to claim 1, wherein said ruthenium-containing compound is selected from the group consisting of ruthenium dioxide, ruthenium dihydroxide, ruthenium acetate, ruthenium chloride, dichlorobis (cycloocatadiene) ruthenium, ruthenium acetylacetonate, pentacarbonyl ruthenium, dodecacarbonyl triruthenium and tetrahydrido-dodecacarbonyl ruthenium.

7. The process according to claim 1, wherein:

said polyketone is a copolymer of ethylene and carbon monoxide; and said polyketone has a carbonyl group content of 40 to 50 equivalent percent.

8. The process according to claim 1, wherein said solvent is one of sulfolane and a mixed solvent containing sulfolane.

9. The process according to claim 8, wherein said solvent is present at a ratio between 5% and 20% by weight to said polyketone.

10. The process according to claim 8, wherein said mixed solvent containing sulfolane contains water.

11. The process according to claim 1, wherein said process is performed at a temperature between 30° C. and 300° C.

12. The process according to claim 1, wherein said process is performed at a temperature between 100° C. and 250° C.

13. The process according to claim 1, wherein said process is performed under one of an atmosphere of hydrogen and a mixed atmosphere containing hydrogen.

14. The process according to claim 13, wherein said process is carried out under a pressure between 50 atmospheres and 200 atmospheres.

* * * * *